United States Patent [19]
Pluta et al.

[11] Patent Number: 5,664,076
[45] Date of Patent: Sep. 2, 1997

[54] APPARATUS AND METHOD FOR MAKING A SCANNABLE FORM ON A BLANK SHEET

[75] Inventors: Karen Ann Pluta, Hamburg; Jacob Matthew Smith, Silver Creek, both of N.Y.

[73] Assignee: Karen A. Pluta, Hamburg, N.Y.

[21] Appl. No.: 364,216

[22] Filed: Dec. 27, 1994

[51] Int. Cl.$^6$ .................................................. G06K 7/10
[52] U.S. Cl. ........................................ 395/117; 395/101
[58] Field of Search ................................ 395/117, 110, 395/101, 112, 111, 105

[56] References Cited

U.S. PATENT DOCUMENTS

| | | | |
|---|---|---|---|
| 4,300,791 | 11/1981 | Bohrer et al. | 283/38 |
| 4,857,715 | 8/1989 | Koch et al. | 235/456 |
| 4,937,439 | 6/1990 | Wanninger et al. | 235/456 |
| 5,184,003 | 2/1993 | McMillin et al. | 235/454 |
| 5,213,373 | 5/1993 | Ramos | 283/5 |
| 5,223,939 | 6/1993 | Imaizumi et al. | 358/296 |
| 5,278,947 | 1/1994 | Balga, Jr. et al. | 395/117 |
| 5,299,295 | 3/1994 | Kim et al. | 395/111 |
| 5,347,302 | 9/1994 | Simonoff | 346/153.1 |
| 5,388,194 | 2/1995 | Vogel | 395/145 |
| 5,434,956 | 7/1995 | Son et al. | 395/105 |

OTHER PUBLICATIONS

"Design Export" brochure of National Computer Systems, Inc., 1994.
"OMR and Testing Software: Saving Time and Getting Results" by E. Greenfield, T.H.E. Journal, vol. 20, issue 8, Mar., 1993, p. 12.

Primary Examiner—Raymond J. Bayerl
Assistant Examiner—Steven P. Sax
Attorney, Agent, or Firm—Hodgson, Russ, Andrews, Woods & Goodyear LLP

[57] ABSTRACT

An apparatus and method for forming a scannable form on a blank sheet from a data file. A computer is operated thereby signaling a printer to print a scannable form having a series of timing marks and further having data derived from the data file including a plurality of indicators of spaces to be optionally marked for scanning. Each of the indicators is aligned with one of the timing marks and with a scan head position for scanning of marked indicator spaces in order that the form as printed by the printer may advantageously be in finished scannable form. The data including the plurality of indicators is preferably heuristically best-fitted for printing on the form.

10 Claims, 8 Drawing Sheets

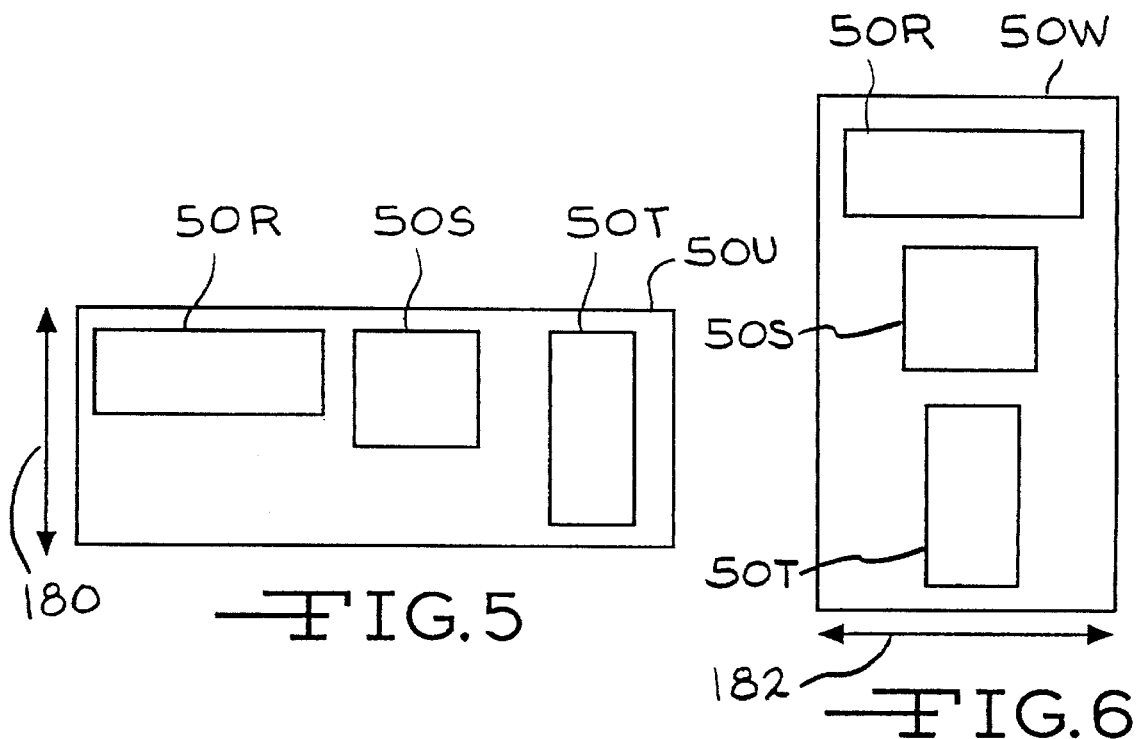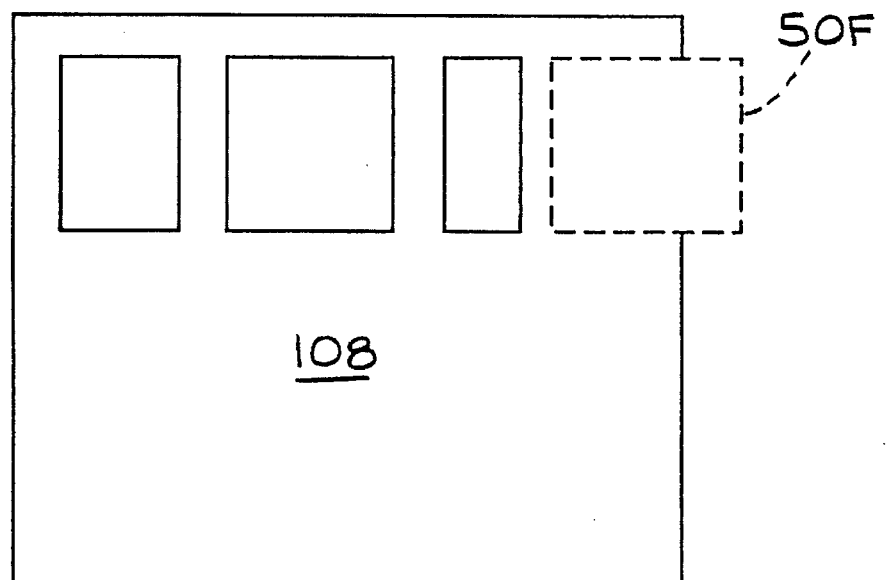

APPARATUS AND METHOD FOR MAKING A SCANNABLE FORM ON A BLANK SHEET

The present invention relates generally to the formation of scannable forms, i.e., forms or documents having spaces or locations to be optionally filled in or marked with a pencil or the like to designate certain information such as the answer to a question. These spaces are designated by indicators such as ovals which are commonly known as bubbles. The spaces within the boundaries of the indicators are optionally blacked in by the user of the form with a pencil. Any designation which serves to indicate a space to be optionally marked may serve as an indicator.

The indicator spaces must be aligned along x and y coordinates with timing marks typically horizontally and with locations during scanning of scan heads typically vertically so that a blacked in or otherwise scannable space may be communicated to a suitable scanner such as an optical mark reader (OMR) for processing of the information to be conveyed. As used herein, the term "scanner" is meant to refer to apparatus for detecting and reading marks at predetermined locations on a sheet, as differentiated from a graphics scanner.

It is important that the indicator spaces be sufficiently precisely aligned so that they are readable by the scanner. Heretofore, in order to achieve the desired preciseness, the substance of a scannable form may, using perhaps a desktop publisher, be inputted to a computer program and processed and the resulting form printed, but without the timing marks or skunk marks (marks typically across the top of a form which communicate to the scanner the identification of the type of form). These unfinished forms have been typically designed on an IBM-compatible computer using Design Expert software for Windows, which software is provided by National Computer Systems, Inc. (NCS) of Minneapolis, Mn. They may then be shipped to NCS which then processes them into scannable forms. While it is not known exactly what process is used by NCS, it is believed that transparencies preprinted with the timing and skunk marks are laid over the unfinished forms and camera images taken thereof.

Such a process undesirably requires the delay and expense involved in shipping unfinished forms to be finished and returned by another party. Even minor changes in a form require this delay and expense. This also does not allow the user to print the forms as they are needed. The user must instead inconveniently order batches of the forms.

Alternatively, NCS may allow for small quantities to be printed using sheets preprinted with timing marks. However, this process undesirably requires creation of the form in stages and is therefore not cost or time effective. There are alignment problems with the preprinted sheets requiring printer adjustments from time to time. The sizes of the bubbles are undesirably increased in order to reduce the alignment problem.

In the article "OMR and Testing Software: Saving Time and Getting Results" by E. Greenfield in THE Journal, Vol. 20, issue n8, March, 1993, at page 12(4), it is stated that Scanning Dynamics, Inc. and Scanning Concepts, Inc. provide forms-creation software which develops tests or surveys on a personal computer then prints the form on standard paper via a laser printer, and that the software also incorporates scanning and scoring functions. The software allows teachers to scan these forms immediately after creating them and obtain the results instantly. The software referred to in this article uses a word processor in graphics mode undesirably requiring the user to "build" bubbles and manually lay out the form on the sheet. This thus requires the time-consuming task of "painting" the form on the system.

U.S. Pat. No. 4,937,439 to Wanninger et al, which is assigned to National Computer Systems, Inc. and which is incorporated herein by reference, discloses a system for creating and scanning a survey form to be completed by a survey respondent wherein the survey form is printed on a scannable form having a preprinted timing track that can be scanned by an optical mark scanner. Such a system requires the use of preprinted forms and thus undesirably does not allow the printing of the scannable forms on standard paper.

U.S. Pat. Nos. 4,857,715 to Koch et al and 5,184,003 to McMillin et al, which are also assigned to National Computer Systems, Inc. and which are also incorporated herein by reference, also disclose the creation of forms using preprinted timing marks. U.S. Pat. No. 4,300,791 to Bohrer et al, which is also assigned to National Computer Systems, Inc., is directed to the printing of sequence bars on signatures of pairs of leaves of answer sheet booklets having scannable forms for the detection of faulty answer sheet booklets prior to their being shipped to customers.

As stated at col. 3, lines 11 to 16, of Wanninger et al, there is a continuing need for a method and system to allow for the timely and cost-effective creation of customized scannable forms or survey forms that will be consistently and correctly scanned by current OMR systems. As previously discussed, the system disclosed in Wanninger et al undesirably does not allow the printing of the scannable forms on standard paper.

It is accordingly an object of the present invention to connect a computer to a printer for printing a finished scannable form that is printable on standard paper.

It is another object of the present invention to reduce the amount of lay-out work required of the user in designing a scannable form.

In order to provide such a finished scannable form, in accordance with the present invention, a computer is operated thereby signaling a printer to print a scannable form having indicators of spaces to be optionally marked for scanning wherein each of the indicators is aligned with a timing mark and a scan head position. Preferably, the data including the indicators to be printed on the form is heuristically best-fitted on the form.

The above and other objects, features, and advantages of the present invention will become apparent in the following detailed description of the preferred embodiments thereof when read in conjunction with the accompanying drawings wherein the same reference numerals depict the same or similar items in the various views.

BRIEF DESCRIPTION OF THE DRAWINGS

FIG. 5 and 6 are diagrams illustrating determinations of minimum height and minimum width respectively during best-fitting of data on the form.

FIG. 7 is a diagram illustrating an object which does not fit with the other objects within a given width.

DETAILED DESCRIPTION OF THE PREFERRED EMBODIMENT

Figure 1:
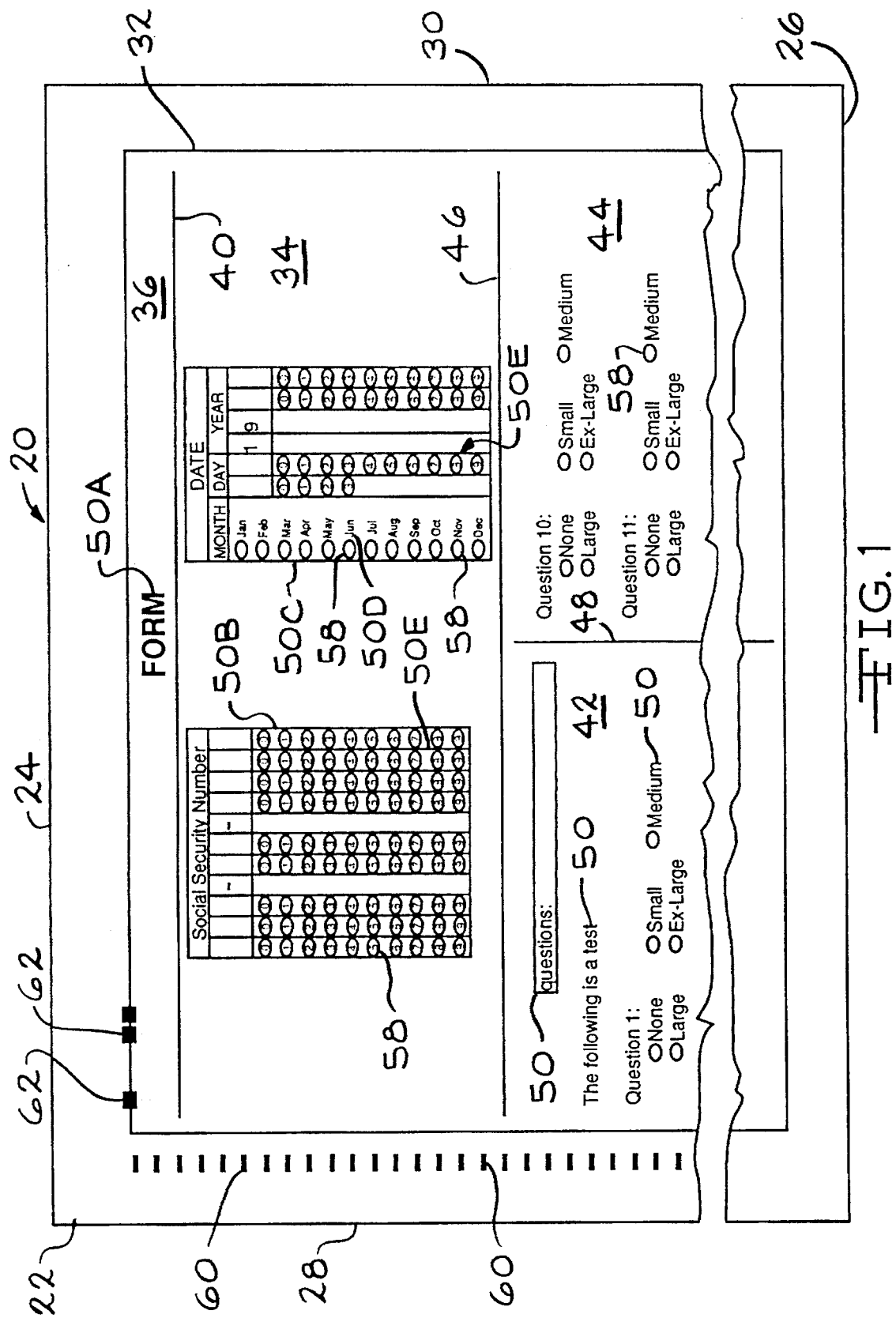
FIG. 1 is a plan view, with a portion removed, of a scannable form to be produced by the present invention.

Referring to FIG. 1, there is illustrated generally at 20 a portion of a scannable form comprising a rectangular sheet of paper 22 on which has been printed information or data, as described hereinafter, in accordance with the present invention. The sheet 22 has upper and lower edges 24 and 26 respectively and left and right side edges 28 and 30 respectively. A rectangular box 32 is printed within the edges bearing margins on all sides and defining a space, illustrated at 34, in which objects, illustrated at 50, may be placed. The upper portion, illustrated at 36, of this space 34 may be reserved for a title object, illustrated at 50A. For example, the title of the form, as illustrated in FIG. 1, is "Form". A horizontal line 40 defines the bottom of the space 36 for the title object 50A.

Below horizontal line 46, the mode is changed so that the lower portion of the object space 34 is sub-divided from one into two columns, illustrated at 42 and 44, defined by the vertical line 48.

In the upper portion of the object space 34 between horizontal lines 40 and 46 are provided two container objects 50, a first constituting a rectangular box 50B which contains children objects relative to social security number information and a second constituting a rectangular box 50C which contains children objects relative to date.

An "object" is defined herein as an item within a form which is defined within a program. An object has a given type (for example, a matrix) which may be adjusted using certain attributes (a matrix can have a set number of columns and may have dividing lines). The type and attributes give the object form and also allow certain adjustments to be made by the program (a matrix with no set number of columns will have the number of columns set by fitting functions).

Container objects are those which contain children objects. These children objects are those which fall within the given area defined by the container object. A box object, such as rectangular boxes 50B and 50C, is often used to create a border around children objects. A base object is one that does not have children objects. In FIG. 1, an oval in combination with the name of a month, illustrated at 50D, would be a base object which is one of several children objects of container object 50C. Smaller rectangles, illustrated at 50E, within either of container objects 50B and 50C, would also be children objects.

Data on the form 20 includes bubbles or indicators 58 such as ovals to be optionally marked such as by blackening the space defined thereby with a pencil (or otherwise making the space scannable) to thereby provide a means to input information to a scanner scanning the form by a signal indicating that the space within the indicator has been blackened or otherwise been made scannable. An indicator by itself or accompanied by some printed material such as the name of a month is a base object. Data on the form 20 also includes text and the previously discussed box objects and lines.

The sheet 22 also contains a series of vertically spaced scannable (blackened) timing marks 60 along the left edge 28 in the margin outside the box 32. A plurality of horizontally spaced scannable (blackened) skunk marks 62 are provided along the upper edge 24 and are shown in FIG. 1 to straddle the upper line of box 32. These skunk marks 62 are provided to allow the scanner to "read" the identification of the type of form being scanned.

Figure 2:
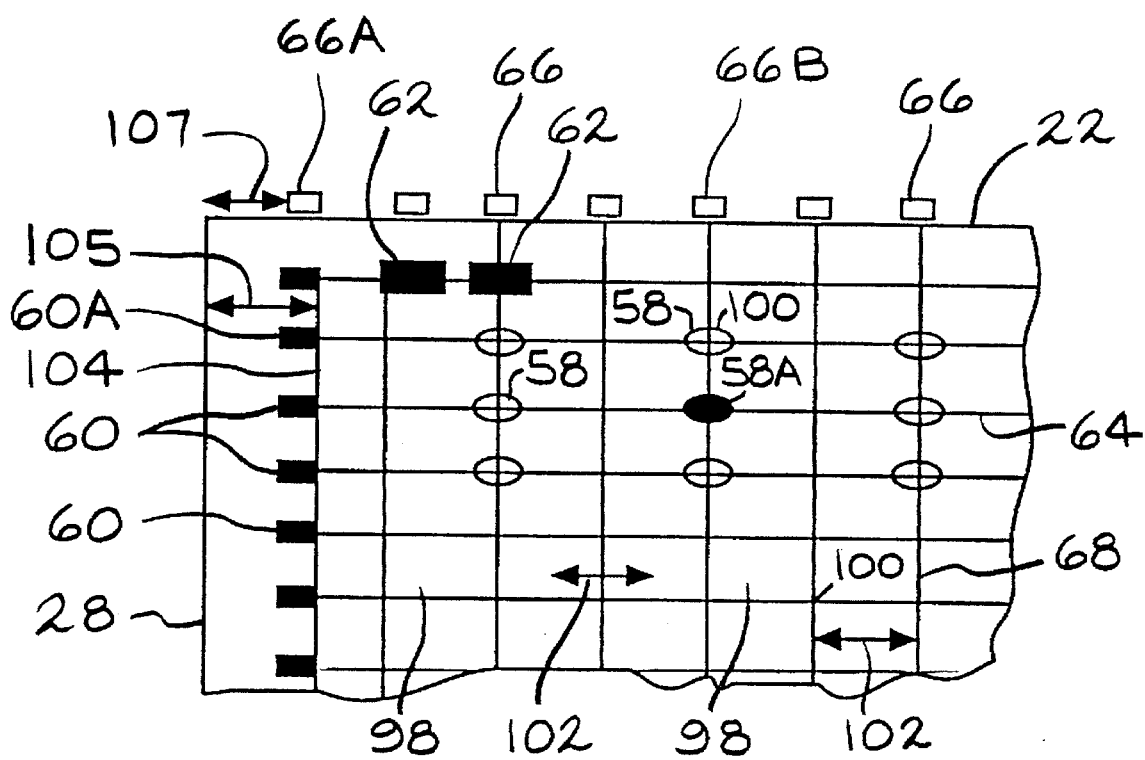
FIG. 2 is a diagram illustrating the alignment of indicators on a sheet for the form.

Referring to FIG. 2, it is important that the indicators 58 as well as skunk marks 62 be horizontally aligned with the respective timing marks 60, as illustrated by horizontal lines 64. Illustrated at 66 are scan heads for a scanner in which the form 20 is inserted for scanning. With the sheet 22 suitably inserted in the scanner, the scan heads 66 are illustrated horizontally spaced along the top edge 24 of the sheet 22. One of the scan heads 66A is aligned with the timing marks 60 so as to detect the timing marks 60 sequentially as the sheet 22 is fed through the scanner. At the same time scan head 66A detects an individual timing mark 60A, each of the other scan heads 66 will detect a blackened indicator 58A which is in alignment horizontally with the timing mark 60A and vertically with the scan head 66B, as is conventionally known in the art. It is thus also important that the indicators 58 as well as skunk marks 62 be vertically aligned with respective scan heads, as illustrated by vertical lines 68, when the sheet 22 is inserted in the scanner for scanning. This horizontal and vertical alignment of an indicator is referred to herein as "snapping" or "positioning" thereof. It should be understood that the grid of alignment lines 64 and 68 is idealized within the computer program and is not normally placed on sheet 22. Unless the indicators 58 are suitably aligned with both the timing marks 60 and the scan heads 66, they cannot be "read".

Figure 3:
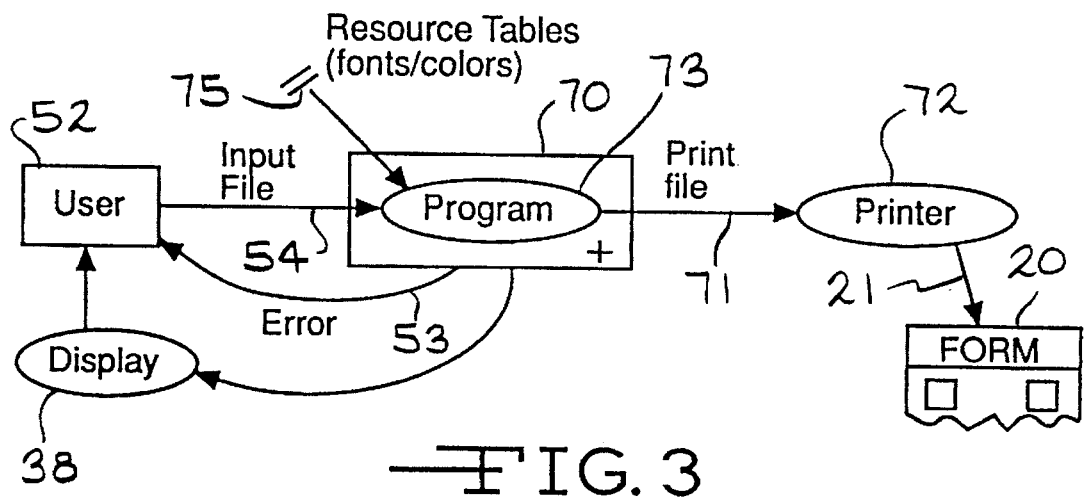
FIG. 3 is a diagram illustrating the apparatus for and process of producing the scannable form.
Figure 15:
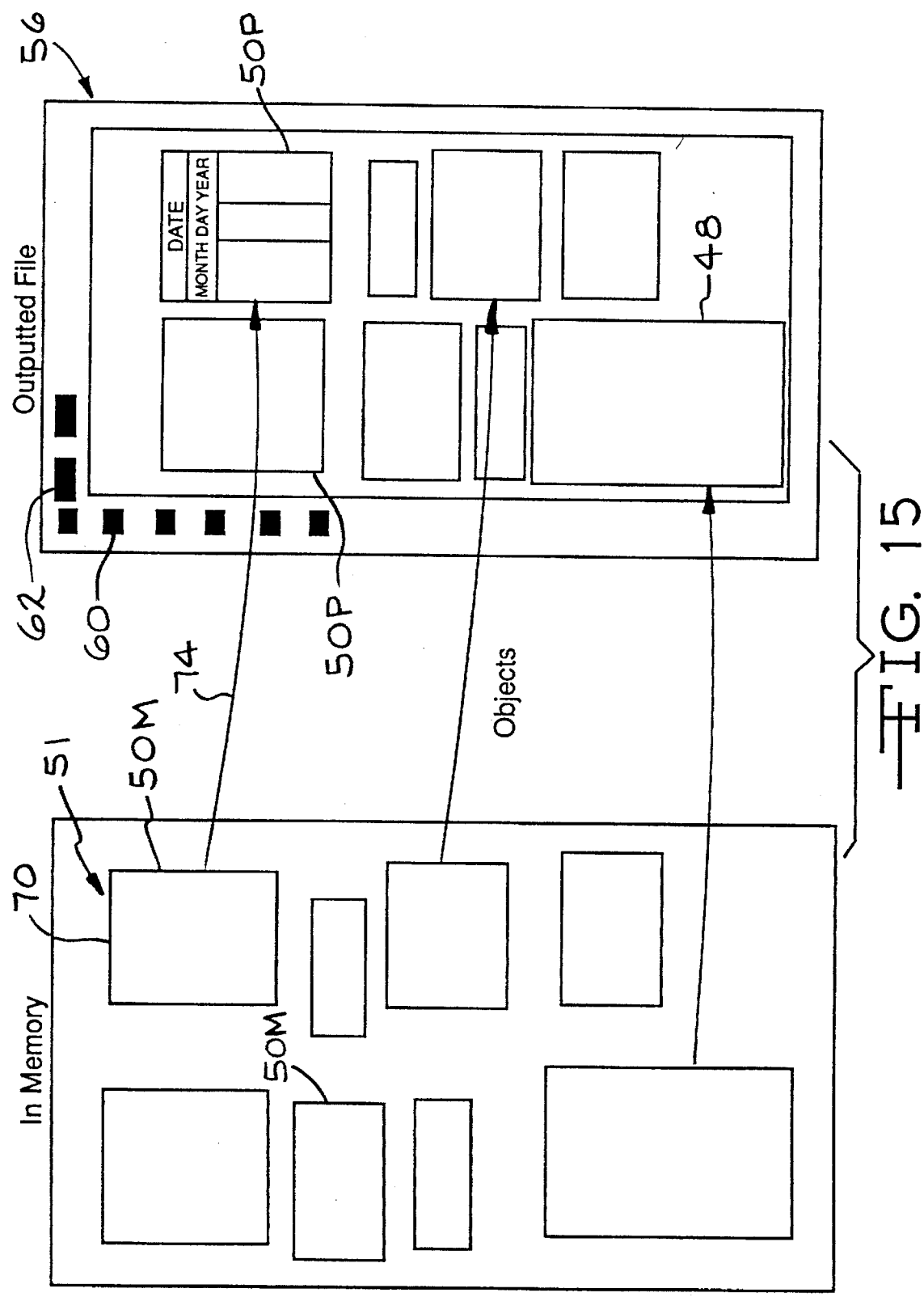
FIG. 15 is a diagram illustrating the transfer of data from the computer's memory to the output file.

Referring to FIGS. 3 and 15, data objects, illustrated at 50M, in an unstructured form, illustrated at 51, inputted, as illustrated at 54, to memory of a suitable programmed general purpose conventional computer, illustrated at 70, such as, for example, an IBM-compatible, Unix, or Amiga computer, are assigned by program 73 positions as well as fonts and colors and the like by means of resource tables, illustrated at 75, and outputted, as illustrated at 74, to a printable file, illustrated at 56. This printable file 56 may be displayed to the user, illustrated at 52, on the computer screen, as illustrated at 38, and any error is returned to the user 52, as illustrated at 53. The computer 70 may also be operated to provide signals, as illustrated at 71, to a suitable conventional printer, illustrated at 72, for printing from the printable file 56 the form 20, as illustrated at 21. For printing of the timing marks 60 outside the margin, there are conventionally known methods commonly found in printer instruction manuals for over-riding printer margins. The positioning of each of the objects 50 or items is based on the form positional information, snap spacing, and layout mode, which are discussed hereinafter.

Before use of the form 20, all of the indicators 58 on one of the forms are darkened preferably by operation of the computer 70 and then defined to the scanner in accordance with principles commonly known to those of ordinary skill in the art to which this invention pertains. This allows the defining to be conducted easily in a single step instead of the several steps required when the indicators are filled in manually at corners of an object. The printing on the forms is not limited to black but may be any color. Likewise, the indicators 58 may be marked by the user in any way which makes them detectable to the scanner with which a form is used.

The program for the computer 70 heuristically best-fits the objects into the form 20 while aligning the indicators 58 and while maintaining a consistent spacing pattern, as will be more apparent hereinafter.

After initial setup, the minimum size and other constraints of objects are set (the "Set-Constraints" function), objects are fitted into given area restraints (the "Fit-Object function), each row is fitted with objects (the "Fit-Row" function), and each page is fitted (the "Fit-Page" function), and the resulting formatted data outputted to the file 56 which can be reviewed and printed by printer device 72. These functions for heuristically best-fitting the data will be discussed more fully hereinafter. The manner in which the objects are edited, stored (internally and externally), and accessed will vary depending on the needs of the particular user and can be done using principles commonly known to those of ordinary skill in the art to which this invention pertains.

Figure 4:
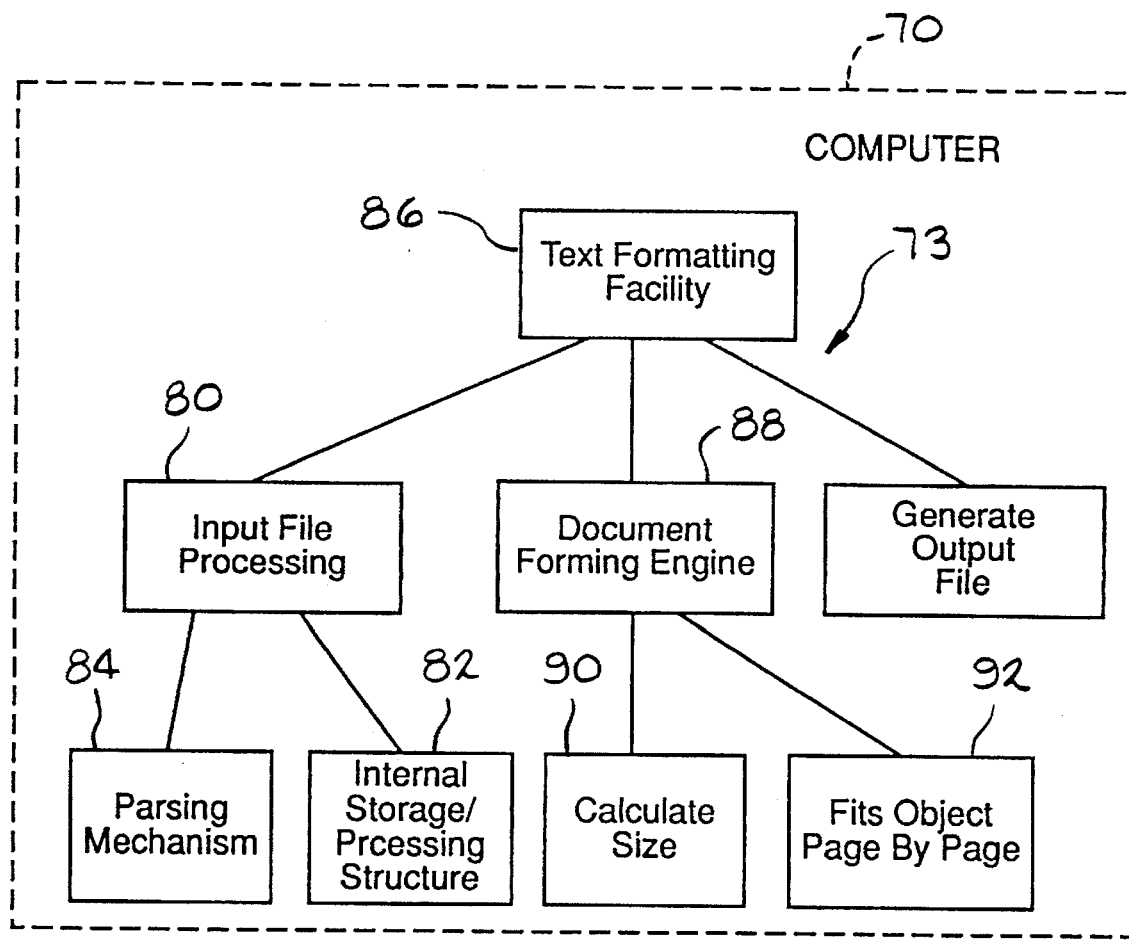
FIG. 4 is a diagram illustrating the operation of the program for generating a printable output file for the scannable form.
Figure 13:
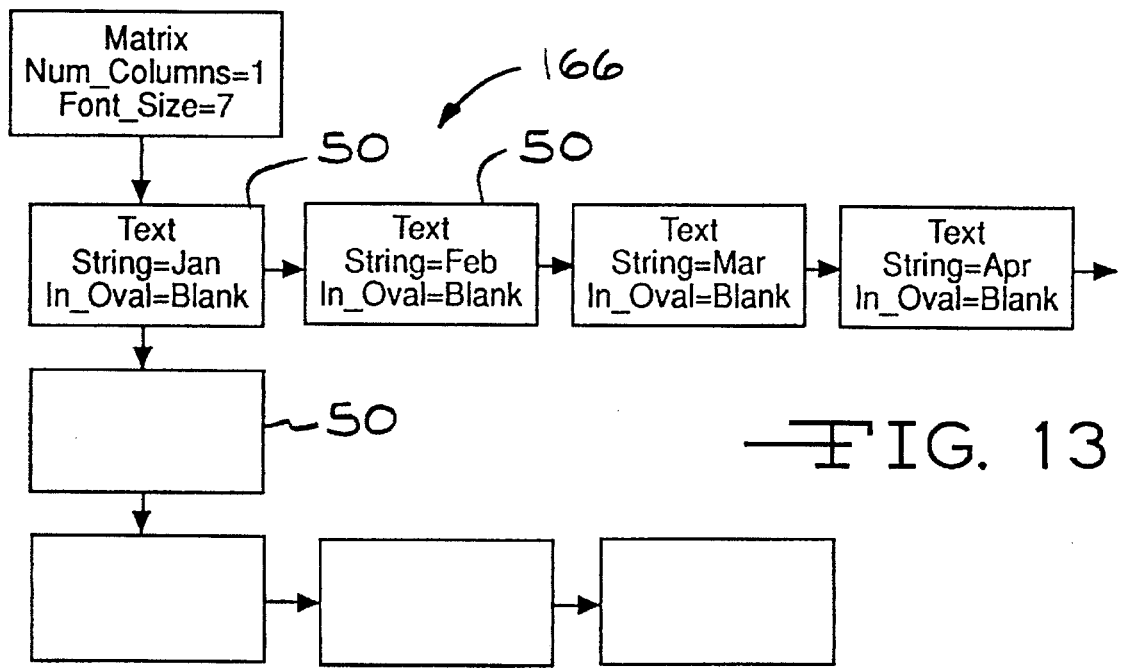
FIG. 13 is a block diagram illustrating an object list for internal storage of the form.

Referring to FIG. 4, the unstructured form 51 of objects for forming the scannable form 20 is inputted, such as by a keyboard, to computer 70 for processing, as illustrated at 80. This unstructured data is read into memory 82, the internal storage and processing structure. A parsing mechanism, illustrated at 84, manipulates the input file 51 in accordance with program requirements, in accordance with procedures commonly known to those of ordinary skill in the art to which this invention pertains, to parse the unstructured form 51 into a tree structure, illustrated at 166 in FIG. 13. Aliases are read into an alias list, and the aliases are expanded in the tree structure 160, forming the objects 50, using principles commonly known to those of ordinary skill in the art to which this invention pertains. The document forming engine 88 utilizes this information to calculate size and fit objects page by page, as illustrated at 90 and 92 respectively, utilizing the previously discussed best-fitting functions to process the tree structure 166 recursively. The text formatting facility 86 utilizes the document forming information from engine 88 to format the text and generates the printable file 56, as illustrated at 94.

The spacing of a container object not only depends on the spacing of its children's objects but also on the edge decorations such as any internal spacing, title text, and its own snapping or positioning requirements. This type of spacing is referred to as "edge spacing" since it usually exists on the surrounding edges of the object. The items that effect this spacing are what constitute the edgings.

Each object 50 to be contained within a form 20 is specified as a separate entity having possible sub-objects. There are also a form object and mode objects such as timing mark spacing and positioning that allow the document to be configured and subdivisions such as columns to be made.

FIG. 5 illustrates at 180 a minimum height, which is independent, of a box 50U for fitting of objects 50R, 50S, and 50T, this minimum height being the height of the tallest sub-object 50T plus edgings. FIG. 6 illustrates at 182 a minimum width, which is independent, of a box 50W for fitting of the objects 50R, 50S, and 50T, this minimum width being the width of the widest sub-object 50R plus edgings.

As previously discussed, the indicators 58 must be snapped into certain aligned positions. A two-dimensional unit internally idealized and called herein a "grid unit", illustrated at 98, and defined by grid lines 64 and 68 is used to measure and make calculations including for positioning or snapping the indicators 58. Objects 50 are snapped or positioned according to the size of a grid unit 98 to thus cause the spacing to match the scan head and timing mark positioning.

An indicator 58 is thus positioned so that its center is at the intersection 100 of a horizontal and vertical grid line 64 and 68 respectively. Thus, scannable ovals are forced to lie on the crossings 100 of the grid and thus be aligned with both the timing marks 60 and the scan heads 66.

The positioning of the vertical grid lines 68 is with respect to the location of the right edge, illustrated by line 104 in FIG. 2, of the timing marks 60 so that alignment of the form 20 is not paper dependent. The printer 72 is instructed to print the timing marks 60 so that the line 104 is a predetermined distance, illustrated at 105, from the edge 28 of the sheet 22. This predetermined distance 105 aligns the scan head 66A with the timing marks 60 since the sheet 22 will be inserted in the scanner with the edge 28 at a predetermined distance, illustrated at 107, from scan head 66A. Thus, when the sheet 22 is inserted in a scanner for reading, the scan heads 66 will scan over lines 68 which are of course imaginary on the form. Since both the scan head and vertical grid line positions are relative to line 104, the imaginary vertical grid lines 68 will be aligned with the scan heads 66 when the edge 28 of sheet 22 is properly positioned in the scanner. Thus, the alignment of the indicators 58 at intersections 100 of grid lines 64 and 68 is not paper dependent and may provide sufficiently precise alignment for "reading" of the indicators 58 reliably. Since the alignment of indicators 58 is not paper-dependent, forms may be printed on both sides of a sheet.

Snap functions refer herein to functions that provide size adjustments based on document settings. Measurements are in points wherein there are 72 points per inch. The distance horizontally between grid lines 68 (or the distance horizontally between mid-points of adjacent grid units 98) is referred to herein as horizontal grid spacing, illustrated at 102. This distance 102 is equal to the distance between the centers of scan heads 66. For example, this distance 102 may be perhaps 12 points for use with a scanner having typically 41 equally spaced scan heads 66 for the objects and an additional 10 scan heads for the margins including the timing marks.

The horizontal snap (width) function acts to increase an object's size so that it will line up with the grid on both sides. The horizontal snap (width) is equal to the ceiling of the object width divided by the horizontal grid spacing which ceiling is then multiplied by the horizontal grid spacing. The functions "ceiling" and "floor" return the upper integer limit and the lower integer limit respectively of the given value. The operation of a snap function results in an integer value (floating point or real with no decimal part) being returned. For example, for an object width of 30 points, the horizontal snap (width) would be equal to the ceiling of 30/12 times 12 which is equal to 3×12 or a snap spacing of 36 points. Thus, the object width is increased by 6 points to a snap spacing so that its side edges are aligned relative to the grid lines. This allows alignment of objects 50 with respect to the grid lines so that more equal spacing of indicators 58 relative thereto may be obtained with the indicators 58 positioned at the intersections 100.

The purpose of a horizontal snap odd (width) function is to set the object width by extending the width to the next odd grid line, i.e., so that the object covers the width of an odd number of grid units 98 when needed for appropriate spacing. Horizontal snap odd (width) is equal to the ceiling of the difference between the width and the horizontal grid spacing divided by twice the horizontal grid spacing which ceiling is multiplied by three times the horizontal grid spacing. Thus, for an object having a width of 18 points, the horizontal snap odd (width) would be the ceiling of (18−12/2×12)×3×12 which is equal to 36 times the ceiling of 0.25 or 36 points, i.e., an odd number of 3 grid units.

The purpose of a horizontal snap even (width) function is to set the object width by extending the width to the next even grid line, i.e., so that the object covers the width of an even number of grid units 98 when needed for appropriate spacing. Horizontal snap even (width) is equal to the ceiling of the sum of the width and the horizontal grid spacing divided by twice the horizontal grid spacing which ceiling is then multiplied by twice the horizontal grid spacing. Thus, for an object having a width of 30 points, the horizontal snap even (width) would be the ceiling of (30+12/2×12)×2(12) which is equal to the ceiling of 1.75 times 24 or 48 points, i.e. an even number of 4 grid units.

The purpose of a horizontal back snap (width) function is to set the object width by reducing the width to the next grid line. Horizontal back snap (width) is equal to the floor of the width divided by the horizontal grid spacing which floor is then multiplied by the horizontal grid spacing. Thus, for an object having a width of 18 points, the horizontal back snap (width) would be the floor of 18/12 multiplied by 12 which is equal to the floor of 1.5 times 12 or 12 points.

The following are examples of programming structures for the above snap functions:

```
Horizontal_Snap(Width):
    ceiling (Width/HorizontalGridSpacing)
    *HorizontalGridSpacing;
Horizontal_Snap_Odd(Width):
    ceiling((Width - HorizontalGridSpacing/
    (2.0*HorizontalGridSpacing))
    *(2*HorizontalGridSpacing) + HorizontalGridspacing;
Horizontal_Snap_Even(Width):
    ceiling((Width + HorizontalGridSpacing/
    (2.0*HorizontalGridSpacing))
    *(2*HorizontalGridSpacing)
Horizontal_BackSnap(Width):
    floor(Width/HorizontalGridSpacing)*HorizontalGridSpacing;
```

In the above pseudo-code, the symbol * represents floating point or real multiplication, and the symbol/represents floating point or real division.

The program may also include horizontal back snap even (width) and horizontal back snap odd (width) functions as well as vertical snap functions corresponding to the horizontal snap functions. The formulas for these snap functions may be derived using principles commonly known to those of ordinary skill in the art to which this invention pertains.

In addition to snapping indicators so that they are reliably aligned for scanning, the objects 50 and areas that are used are also thusly snapped in order to insure that all inner fitting will work, i.e., the sub-objects will be aligned relative to the parent object. Thus, their snap spacing will be relative to the parent's snap spacing such that when the parent object is placed, all the objects (parent and children) will be aligned to the snap grid spacing. This is preferably enforced physically (the areas being of the snapped spacing). Alternatively, this can be enforced logically (the areas are back-snapped to limit sub-objects but still allow slight size freedom).

For each object there is a minimum size possible. This is based on the aspects, attributes, and contents of the object. The term "aspects" refers to how an object behaves, for example, a matrix and the dividing of columns. The attributes drive the aspects of an object. Examples of attributes are font size, font type, line weight, and title text. The contents of an object are the children objects. For example, the object illustrated at 50D in FIG. 1 has no content since it has no children objects. The "appearance" of an object will be determined by the aspects combined with the attributes.

Particularly, there is a minimum width and a minimum height, which are independent and can be calculated, for an object. For example, the minimum height of a box is the height of the tallest sub-object plus edgings whereas its minimum width is the maximum width of the widest sub-object plus edgings. These minimums are used to make sure that objects do not recess beyond their smallest unit. FIG. 7 illustrates an attempt to fit an object, illustrated at 50F, in a space 108 that it cannot fit within. This is the terminating case in some of the functions. The test for this limit is the minimum space. Both the minimum height and the minimum width can be calculated and used. However, the present invention may also be made to easily work with only the minimum width.

Figure 8:
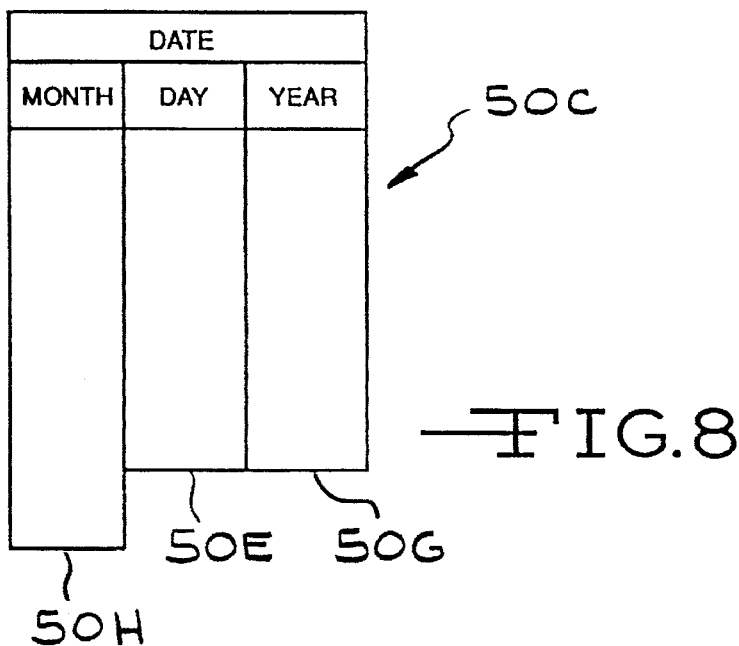
FIG. 8 is a diagram illustrating the results when an equal height relation of a plurality of related objects is not set.

Other types of constraints, which extend the control therein, can be added to the system. For instance, referring to FIG. 8, an equal height constraint may be provided which allows two or more parts or children of an object to be forced to use the same height by setting the height of all of the objects to the greater height of the objects. Thus, FIG. 8 shows child objects 50E and 50G to have a lesser height than child object 50H of container object 50C. In accordance with the constraint, the height of child objects 50E and 50G would be increased to that of child object 50H so that container object 50C appears as illustrated in FIG. 1. For another example, a minimum height attribute may be provided to make sure that an object is of at least a minimum height (based on the grid unit).

These constraints (and any related links) are set during the first pass of the tree structure 166. This pass can be implemented recursively, passing each son (a single child) to the Set_Constraints function first, then calculating the current object's constraints based on its attributes and on the children's constraints (if children are possible). The following is an example of programming structure for this function:

```
Set_Constraints (Object):
    foreach Child of Object do
        Set_Constraints (Child);
    case ObjectType
        Box:
            {Set Box based constraints . . . }
        .
        .
        .
        Oval:
            {Set oval based constraints . . . }
        Text:
            {Set Text based Constraints . . . }
    end case;
        {Set/Adjust according to General Constraints here. . . }
```

As seen by examining the above pseudo-code, there are two types of constraints, i.e., those based on the object type (for instance, the minimum width depends on the object type implementation) and those that are general (for example, the minimum height requirement). The term "oval" refers to the indicators 58.

Certain types of constraints may require multiple passes, such as the "height" attribute, illustrated with reference to FIG. 8, that matches heights between children or different objects. This may be implemented by using multiple passes and returning a boolean value telling whether another pass is required in accordance with principles commonly known to those of ordinary skill in the art to which this invention pertains.

The Fit_Object function is provided to take an object and fit it within the given area restraints, those of a maximum width and height. This is done by adjusting the object (sub-objects first, recursively) according to its constraints (given within the attributes). For instance, an equal_rows setting of the matrix enforces more restrictions on size.

Figure 14:
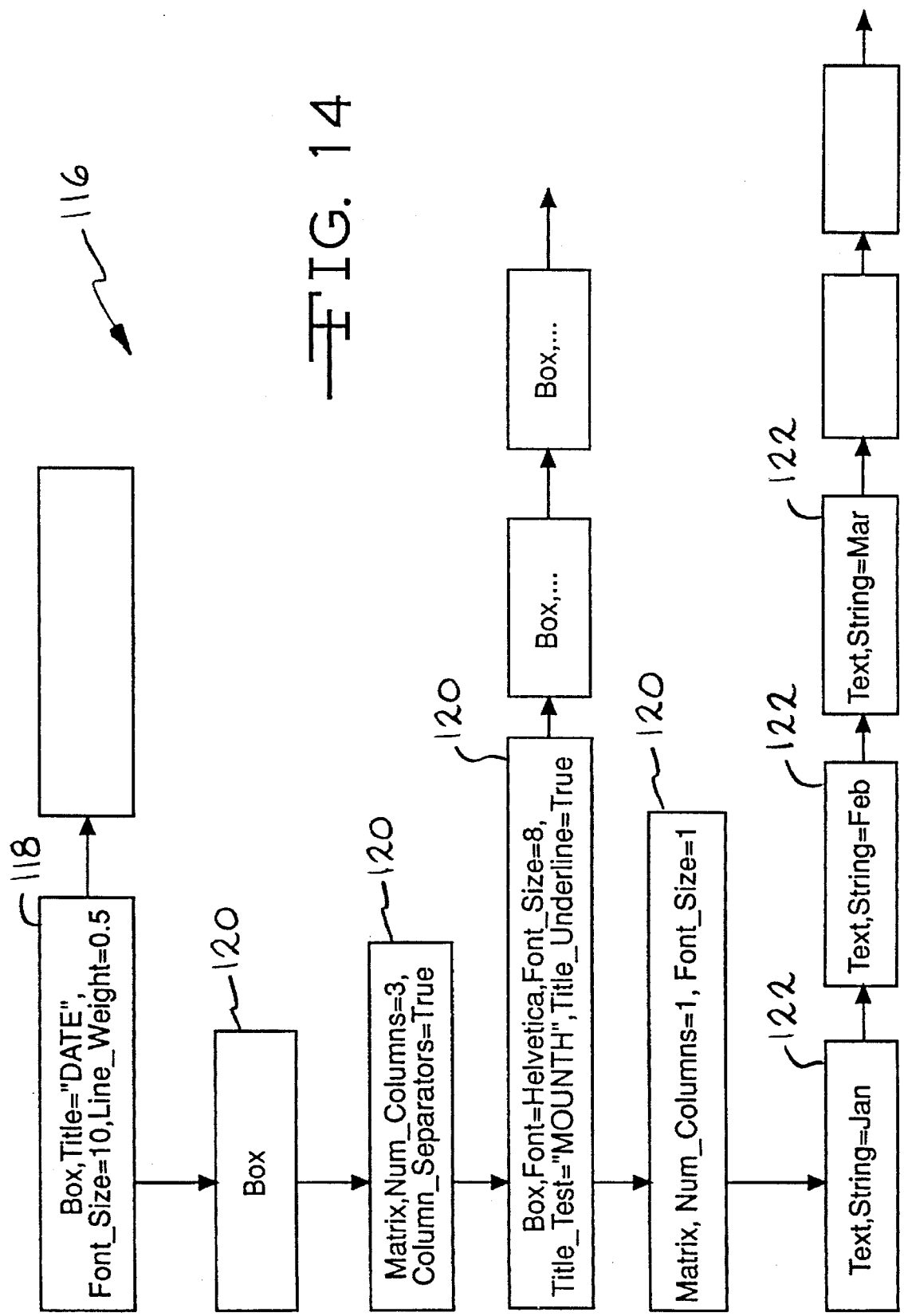
FIG. 14 is a block diagram illustrating the internal structure showing the objects relations.

Before the function starts, stored in memory along with the object are all the attributes of the object, as illustrated at 116 in FIG. 14. The object is generally passed as a pointer to a structure containing the object definition, illustrated at 118, along with all its information-attribute-list and children-list, illustrated at 120 at 122 respectively. Base objects are calculated first, and the children objects are set in order. Along with the calculations for minimum width, as discussed hereinafter, this area is passed to the function to fit the object into.

Figure 9:
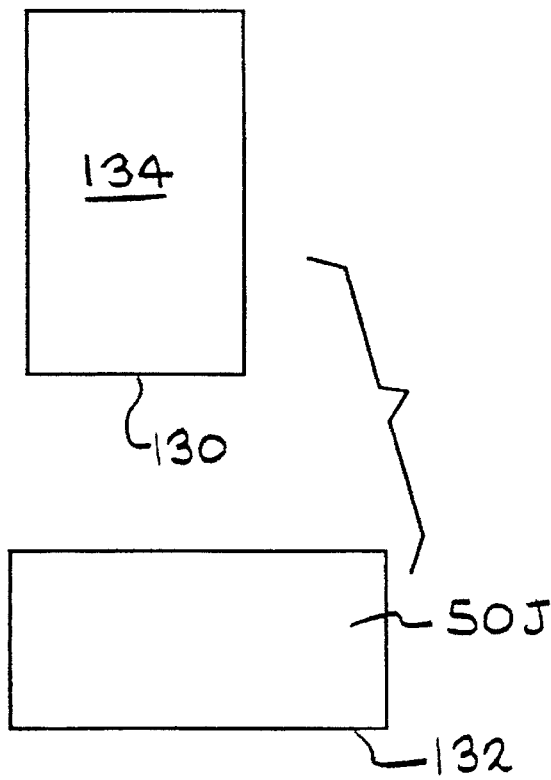
FIGS. 9 and 10 are diagrams illustrating comparisons of objects with areas determining that the objects do not fit within the respective areas.
Figure 10:
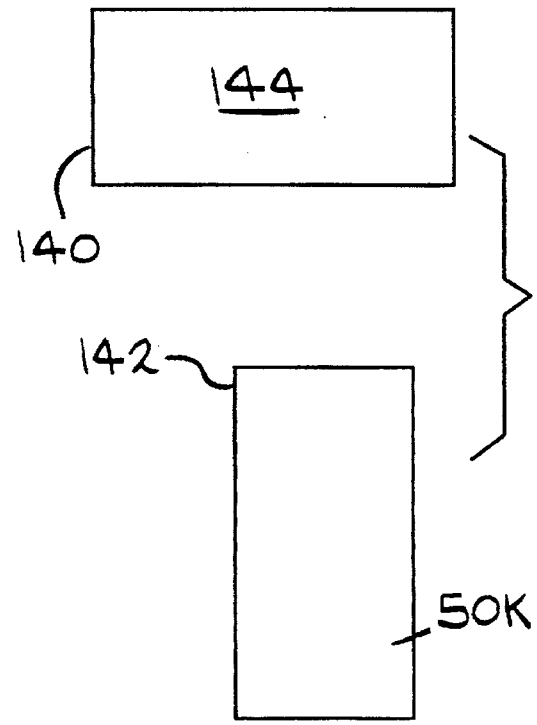

Since the purpose of the function is to fit the given object into a specified area, we can back out of this function at any point that we know that it will not fit the given area. When the function returns, there is a need that it indicate whether the fitting worked or not. This can be done in a couple of ways. One way is to have the function explicitly return a boolean value (true/false) telling explicitly whether the fitting worked. Alternatively, the object can be returned with the sizes set such that they either fit within the area (ObjectWidth<=GivenWidth and ObjectHeight<=GivenHeight) or not (ObjectWidth>GivenWidth or ObjectHeight>GivenHeight) explicitly telling whether the fit worked. Thus, for example, lower edges 130 and 132 of area 134 and object 50J respectively in FIG. 9 are compared and a determination made that the object 50J will not fit within the area 134. For another example, side edges 140 and 142 of area 144 and object 50K respectively in FIG. 10 are compared and a determination made that the object 50K will not fit within the area 144. After failure to place an object within a given area, the object is returned with a non-fitting size. The size is thus determined during the process of determining if an object fits within a given area. The latter alternative allows for easy extension of interaction (error messages such as "object too wide" or "object too tall" or visual information).

Because the minimum width of the object (minimum width) is known, the operator can check if the object can, at all, fit within the given area. Also, once it is found that the object cannot fit within the given area, it can be dropped back out. If size is used to let the calling function know that the operation did not work, then the size of the object should be set to a non-fitting size, which can usually be attained by using the minimum width, as discussed previously. A non-fitting size must be returned so that the object does not "appear" to fit in the area, i.e., if a value other than the original setting is not returned, then the object would seem to fit in the smaller area. Hence, to let the area know that the object did not fit, a larger non-fitting size is sent back thus ensuring that the object will not try to fit in this smaller area.

A base object has limited area requirements. These are usually quite static and thus almost never change. For such a base object, the calculations can be made, checked to see if the object fits within the given area, and then returned. For a container object, the allotted area needs to be divided up based on rules for the particular object type, and the children need to fit into this divided area by recursively calling "Fit_Object". For instance, a matrix with "equal_columns" needs to make sure that it can have all its columns set to the same width while still trying to fit within the given width. Such a matrix will be divided evenly, and each child will be passed to "Fit_Object" with the divided area. Each object uses the snap functions to provide complete grid area fittings. An example of programming structure for this function is as follows:

```
Fit_Object (Object, Area_Width, Area_Height):
    if Object's MinimumWidth>Width then return False;
    case ObjectType of
        Box:.
            {Box Fit Functioning ... }
        Matrix:
            {Matrix Fit Functioning ... }
        .
        .
        .
        Text:
            {Text Fit Functioning ... }
    end case;
```

When there is a given area that is to be divided into rows and a set of objects to make rows out of, the "Fit_Row" function is provided to make a single row out of the current space and set of objects.

The operation comprises trying to fill a row with objects. This is extended by the view that a row has a certain height (the row being generally as tall as its tallest object). Thus, a group of objects may be able to fit in a vertical area and even horizontally and vertically within subspaces made by this division. Recursion is useful for implementing this function.

The current height of the row is set to the height of the first object to be inserted. This height will be adjusted (growing only taller) as the operation proceeds. The program keeps track of a new height in order to test whether the height grew. If the new height has grown greater than the old (current) height, then the row can be re-created. This allows possible vertical adjustments making the use of extra vertical space that wouldn't otherwise be used. This may be implemented as a loop (generally the outermost loop) of the function.

An inner loop is provided that tests whether an object will fit within the width left, objects being generally inserted from left to right, i.e., in reading order. Thus, before this loop, the width still available (width left) is set equal to the width of the current space. As the loop proceeds, the width is adjusted as each object or group of objects is inserted, subtracting the area taken up from the width left. When space or width left has run out, the creation of a row has been accomplished, and we return to the outermost loop.

Figure 11:
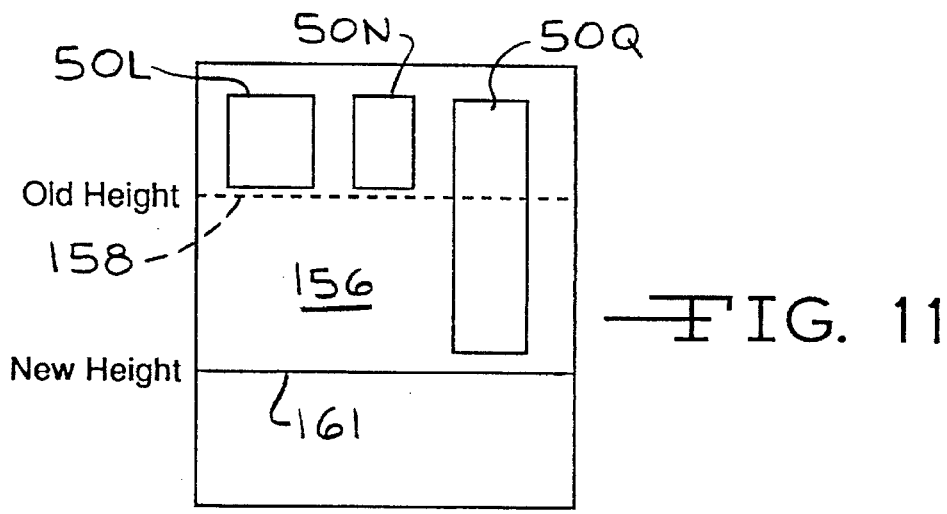
FIG. 11 and 12 are before and after diagrams respectively illustrating a determination of minimum height and the best-fitting of objects within that minimum height.
Figure 12:
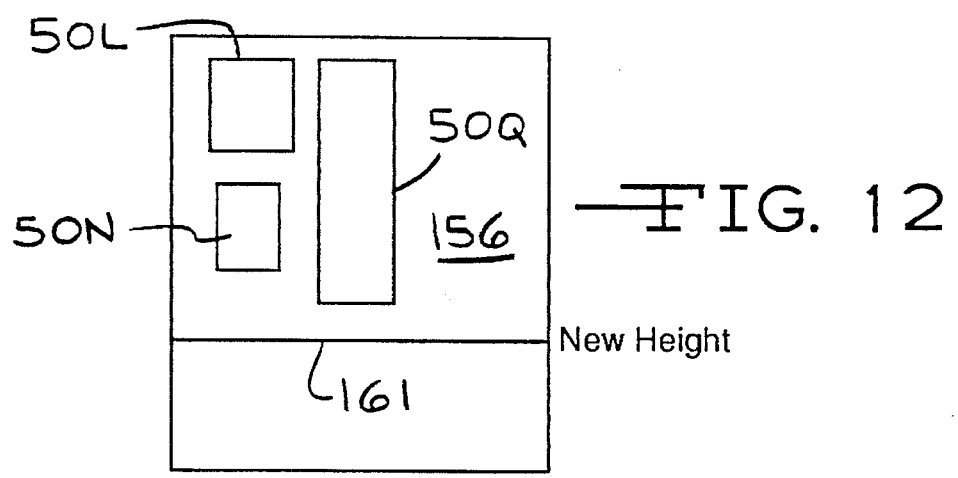

Thus, referring to FIG. 11, the outer loop determines a height difference between objects 50L, 50N, and 50Q to be fitted within space 156. This is the difference between old height 158, before an attempt is made to fit object 50Q, and the new height 161, after an attempt is made to fit object 50Q. As seen in FIG. 12, the inner loop is made, and an innermost loop is made to determine if more objects will fit within the area 156.

The following is an example of programming structure for the "Fit_Row" function:

```
Fit_Row (Space, Object_List):
    CurrentHeight = Height_of_First Object;
    (*Usually minimum height*)
    NewHeight = CurrentHeight + SomeExtraValue;
    While NewHeight>CurrentHeight
    * PossibleAdjustValue1 loop
        CurrentHeight = NewHeight;
        WidthLeft = Width Of Space;
        {Possibly use Fit_Object here to get initial sizing ... }
        While objects MinWidth<= WidthLeft and
```

```
    Objects_Height<=
        CurrentHeight loop
        InsertHeight = O; (*Top of area*)
        CurrentWidth = Objects_MinWidth*
            PossibleAdjustValue2;
        While Objects_MinWidth<= CurrentWidth and
        Objects Height<= Current Height-InsertHeight/loop
            {Use Fit Objects to try to place Object into
                area . . . }
            {Adjust InsertHeight according to current
                object . . . }
            {Possible recursive calls to Fit_Row . . . }
        end loop;
        {Adjust WidthLeft by space taking during
            iteration . . . }
        {Adjust NewHeight according to tallest Object
            used . . . }
    end loop;
end loop;
```

Note that once Fit_Row has finished processing, the positions or coordinates may be adjusted in order to do things such as space or center objects. This function can be restarted whenever an object of taller height than the current height is found that still fits in the width. In the above programming structure, the outer loop extends between line 4 and the last line, the inner loop extends between line 8 and the next-to-last line, and the innermost loop extends between lines 13 and 20.

After initial set up and processing of the given objects, there is a set of objects available, and page definitions are set up. A "page definition" refers to an area to work within which includes the grid units. At this point, the "Fit_Page" function is called to fit as many objects on a page as possible.

The arguments (parameters to be used) of the function generally include the page definitions and the object to try to fit on the page. This is usually a pointer into a list of objects, pointing at the first object available after the last Fit_Page call.

Fit_Page relays directly on Fit_Row, which considers each area of space on a page. The objects are inserted row by row as calls are made to Fit_Row until no more objects can be fitted into the space. It should be noted that one page can be split into multiple areas, i.e., columns and a space above the location where the columns start. The following is an example of programming structure for this function:

```
Fit_Page (Page_Definitions, Object_List):
    foreach Area_in_Page Loop
        repeat
            Fit_Row (Area, Current_Start_Object);
        until No_Space_Left;
    end loop;
```

The test whether there is space left can be done a couple of ways. One way is to have the Fit_Row function explicitly return a boolean value (true/false) indicating whether it was able to fit objects into the current space. Thus, if Fit_Row cannot fit an object into the space left, then the area is full. This takes a little more manipulation as the Fit_Object function needs to be called to try to fit the object into the space provided. Note also that Fit_Row and Fit_Page must return to the position within the list of objects such that the next object to be inserted is known.

Although the form processing described herein is of the batch type, the present invention may also be adapted to provide an interactive version which allows the user to create objects which are automatically fit into the form and seen on screen as they are created. Insertion of objects and changes to the document could as a result be done at any time and place with the effects being visible immediately.

If an enhancement to a form is desired, the present invention allows the user to merely add a new file to the system.

While a specific embodiment of the invention has been shown and described in detail to illustrate the application of the principles of the invention, it will be understood that the invention may be embodied otherwise without departing therefrom. For example, although C is one suitable language in which the program can be written and the form printed on a PostScript printer, PostScript being a trademark of Adobe Systems, utilizing a Scanmaster version 1.0 program, it can be written in any other suitable programming language and printed on any suitable printer. Such other embodiments are meant to come within the scope of the present invention as defined in the appended claims.

What is claimed is:

1. A method for forming a scannable form from a data file comprising operating a computer thereby (a) signaling a printer to print on a blank sheet of paper a series of timing marks along with data derived from the data file including a plurality of indicators of spaces to be optionally marked for scanning, and (b) aligning each of the indicators with one of the timing marks and with a scan head position for scanning of marked indicator spaces, wherein the step of aligning comprises providing horizontal and vertical grid lines to be aligned with the timing marks and scan head positions respectively with the vertical grid lines positioned relative to the position of the timing marks and positioning the indicators at the positions respectively of intersection of grid lines.

2. A method according to claim 1 further comprising snapping data objects to be aligned with grid lines.

3. A method according to claim 1 further comprising heuristically best-fitting the data including the plurality of indicators for printing on the form.

4. A method according to claim 3 wherein the step of best-fitting the data comprises setting minimum sizes of objects, fitting objects into area restraints, fitting objects into rows, and fitting objects into pages.

5. A method according to claim 1 further comprising operating the computer thereby marking all of the indicators on the form and defining the indicators to a scanner.

6. Apparatus for forming a scannable form from a data file comprising a computer including (a) means for signaling a printer to print on a blank sheet of paper a series of timing along with data derived from a data file including a plurality of indicators to be optionally marked for scanning, and (b) means for aligning each of the indicators with one of the timing marks and with a scan head position for scanning of marked indicator spaces, said aligning means comprising means for inputting horizontal and vertical grid lines to be aligned with the timing marks and scan head positions respectively with the vertical grid lines positioned relative to the position of the timing marks and means for positioning the indicators at the positions respectively of intersection of grid lines.

7. Apparatus according to claim 6 further comprising means for snapping data objects in alignment with grid lines.

8. Apparatus according to claim 6 further comprising means for heuristically best-fitting the data including the plurality of indicators for printing on the form.

9. Apparatus according to claim 8 wherein said best-fitting means comprises means for setting minimum sizes of objects, means for fitting objects into area restraints, means for fitting objects into rows, and means for fitting objects into pages.

10. Apparatus according to claim 6 wherein said computer further includes means for marking all of the indicators on the form whereby the form may be defined to a scanner.

* * * * *

UNITED STATES PATENT AND TRADEMARK OFFICE
CERTIFICATE OF CORRECTION

PATENT NO. : 5,664,076
DATED : 9/2/97
INVENTOR(S) : Pluta et al

It is certified that error appears in the above-indentified patent and that said Letters Patent is hereby corrected as shown below:

Col. 12, line 43 - after "timing", insert --marks--.

Signed and Sealed this

Twenty-fourth Day of February, 1998

*Attest:*

BRUCE LEHMAN

*Attesting Officer*     *Commissioner of Patents and Trademarks*